(12) United States Patent
Lin et al.

(10) Patent No.: US 10,908,365 B2
(45) Date of Patent: Feb. 2, 2021

(54) OPTICAL FIBER CONNECTOR HAVING A COVERED POSITIONING MEMBER

(71) Applicant: AMPHENOL FIBER OPTIC TECHNOLOGY (SHENZHEN) CO., LTD., Shenzhen (CN)

(72) Inventors: Jim Lin, Kaohsiung (TW); Shu-Hui Hsu, Kaohsiung (TW); Wen-Chi Kuo, Kaohsiung (TW)

(73) Assignees: GLORIOLE ELECTROPTIC TECHNOLOGY CORP., Kaohsiung (TW); AMPHENOL FIBER OPTIC TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/737,119

(22) Filed: Jan. 8, 2020

(65) Prior Publication Data
US 2020/0218013 A1    Jul. 9, 2020

(30) Foreign Application Priority Data
Jan. 9, 2019 (TW) .............................. 108200356 U (51) Int. Cl.
*G02B 6/38* (2006.01)

(52) U.S. Cl.
CPC ................................ *G02B 6/3807* (2013.01)

(58) Field of Classification Search
CPC ... G02B 6/3807; G02B 6/3825; G02B 6/3879
See application file for complete search history.

(56) References Cited

U.S. PATENT DOCUMENTS

| | | | | |
|---|---|---|---|---|
| 6,648,520 B2* | 11/2003 | McDonald | ........... | G02B 6/3887 385/78 |
| 6,899,467 B2* | 5/2005 | McDonald | ........... | G02B 6/3869 385/78 |
| 7,234,877 B2* | 6/2007 | Sedor | ................... | G02B 6/3879 385/59 |
| 7,568,844 B2* | 8/2009 | Luther | ................. | G02B 6/3869 385/52 |
| 8,152,385 B2* | 4/2012 | de Jong | ............... | G02B 6/3879 385/71 |
| 8,523,455 B2* | 9/2013 | Luther | ................. | G02B 6/3869 385/60 |
| 8,727,638 B2* | 5/2014 | Lee | ..................... | G02B 6/3879 385/78 |
| 9,465,172 B2* | 10/2016 | Shih | ..................... | G02B 6/3871 |

(Continued)

*Primary Examiner* — Andrew Jordan
(74) *Attorney, Agent, or Firm* — Muncy, Geissler, Olds & Lowe, P.C.

(57) ABSTRACT

An optical fiber connector adapted to use with two optical fibers includes a base seat, a positioning member, and a joint unit. The base seat includes a tubular wall defining an axial hole and two extension walls defining an accommodation space in spatial communication with the axial hole. The positioning member is disposed in the axial hole and defines a channel permitting the optical fibers to extend therethrough. The joint unit includes two central pins and two sleeves. The central pins are adapted to be connected respectively to the optical fibers. The sleeves are sleeved respectively on the central pins and are detachably mounted to the base seat such that positions of the central pins relative to each other are fixed.

11 Claims, 12 Drawing Sheets

(56) References Cited

U.S. PATENT DOCUMENTS

| | | | |
|---|---|---|---|
| 9,625,658 B1* | 4/2017 | Lin | G02B 6/3879 |
| 10,078,186 B1* | 9/2018 | Hsu | G02B 6/3879 |
| 10,191,230 B2* | 1/2019 | Wong | G02B 6/3893 |
| 10,527,802 B2* | 1/2020 | Wong | G02B 6/3893 |
| 2003/0063867 A1* | 4/2003 | McDonald | G02B 6/3869 |
| | | | 385/78 |
| 2004/0047566 A1* | 3/2004 | McDonald | G02B 6/3894 |
| | | | 385/78 |
| 2006/0089049 A1* | 4/2006 | Sedor | G02B 6/3879 |
| | | | 439/620.21 |
| 2008/0044137 A1* | 2/2008 | Luther | G02B 6/3869 |
| | | | 385/60 |
| 2009/0310916 A1* | 12/2009 | Luther | G02B 6/3869 |
| | | | 385/60 |
| 2012/0155810 A1* | 6/2012 | Nakagawa | G02B 6/3879 |
| | | | 385/78 |
| 2016/0216458 A1* | 7/2016 | Shih | G02B 6/3871 |
| 2017/0299817 A1* | 10/2017 | Huang | G02B 6/38 |
| 2018/0217340 A1* | 8/2018 | Wong | G02B 6/3821 |
| 2020/0218013 A1* | 7/2020 | Lin | G02B 6/3879 |
| 2020/0264383 A1* | 8/2020 | Yang | G02B 6/3825 |
| 2020/0310038 A1* | 10/2020 | Verheyden | G02B 6/3849 |
| 2020/0310048 A1* | 10/2020 | Chang | G02B 6/3879 |
| 2020/0310066 A1* | 10/2020 | Zimmel | G02B 6/389 |

* cited by examiner

OPTICAL FIBER CONNECTOR HAVING A COVERED POSITIONING MEMBER

CROSS-REFERENCE TO RELATED APPLICATION

This application claims priority of Taiwanese Utility Model Patent Application No. 108200356, filed on Jan. 9, 2019.

FIELD

The disclosure relates to a connector, more particularly to an optical fiber connector.

BACKGROUND

Figure 1:
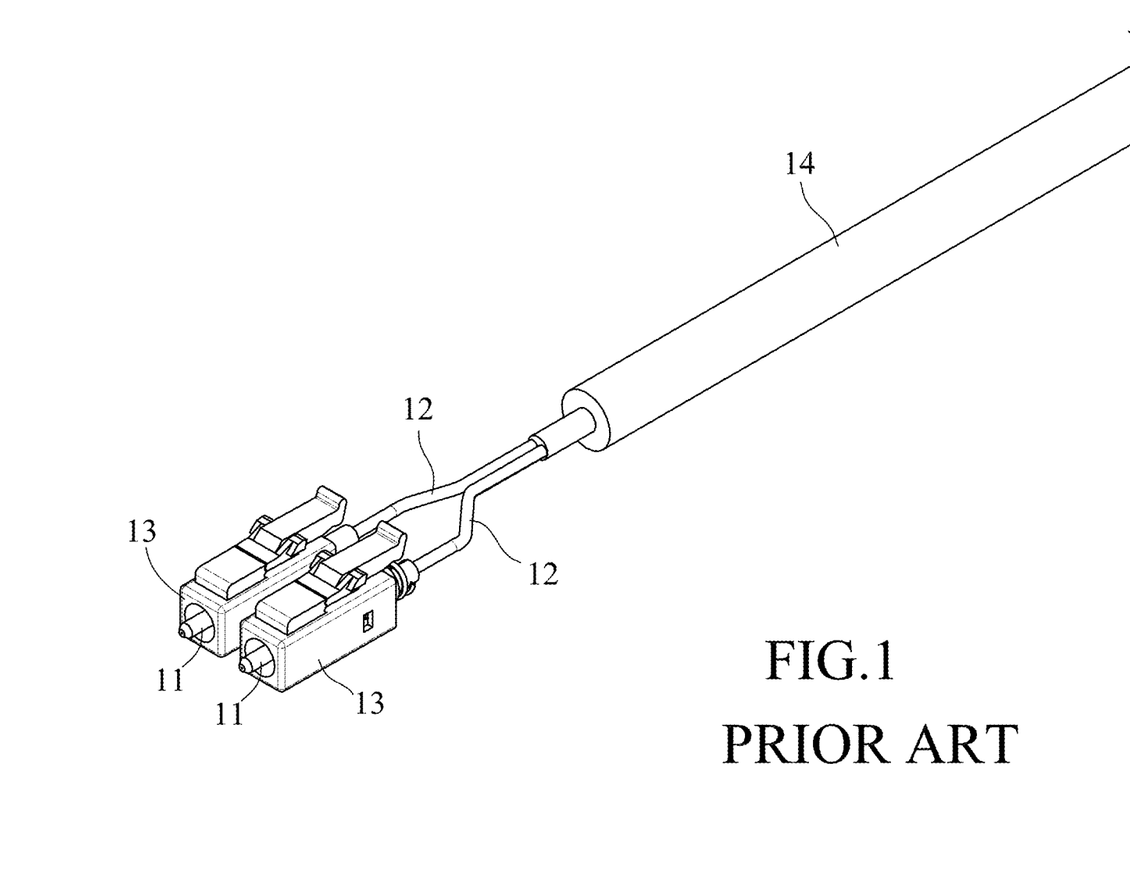
FIG. 1 is a schematic perspective view of a conventional optical fiber connector.

Referring to FIG. 1, a conventional optical fiber connector for interconnecting optical fibers is shown. In order to transmit and receive signals simultaneously, the conventional optical fiber connector, e.g. a duplex lucent connector including two terminals. Each of the terminals of the lucent connector includes a central pin 11, an optical fiber 12 connected to the central pin 11, and a sleeve 13 sleeved on the central pin 11. The sleeves 13, for example snap plugs are to be engaged respectively with two sockets (not shown), such that the central pins 11 are engaged respectively to the sockets. To protect the optical fibers 12, a protective sheath 14 is disposed to surround the optical fibers 12. However, the positions of the central pins 11 relative to each other, as well as the sleeves 13, are movable. As a result, it is troublesome for a user to align the sleeves 13 respectively with the sockets when engagement of the central pins 11 with the sockets is required. Further, the optical fibers 12 are partially exposed outwardly of the protective sleeve 14 and may be tangled undesirably.

SUMMARY

Therefore, an object of the disclosure is to provide an optical fiber connector that can alleviate at least one of the drawbacks of the prior art.

According to one aspect of the disclosure, an optical fiber connector adapted to use with at least two optical fibers is provided. The optical fiber connector includes a base seat, a positioning member, and a joint unit. The base seat includes a tubular wall and two extension walls. The tubular wall extends in an axial direction, defines an axial hole extending in the axial direction, and has front and rear ends opposite to each other in the axial direction. The extension walls extend from the front end of the tubular wall in the axial direction, are spaced apart from each other in a radial direction transverse to the axial direction, and define an accommodation space in spatial communication with the axial hole. The positioning member is disposed in the axial hole and defines a channel extends in the axial direction and adapted to permit the optical fibers to extend therethrough. The joint unit includes two central pins and two sleeves. The central pins are adapted to be connected respectively to the optical fibers. The sleeves are sleeved respectively on the central pins and are detachably mounted to the base seat such that positions of the central pins relative to each other are fixed.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
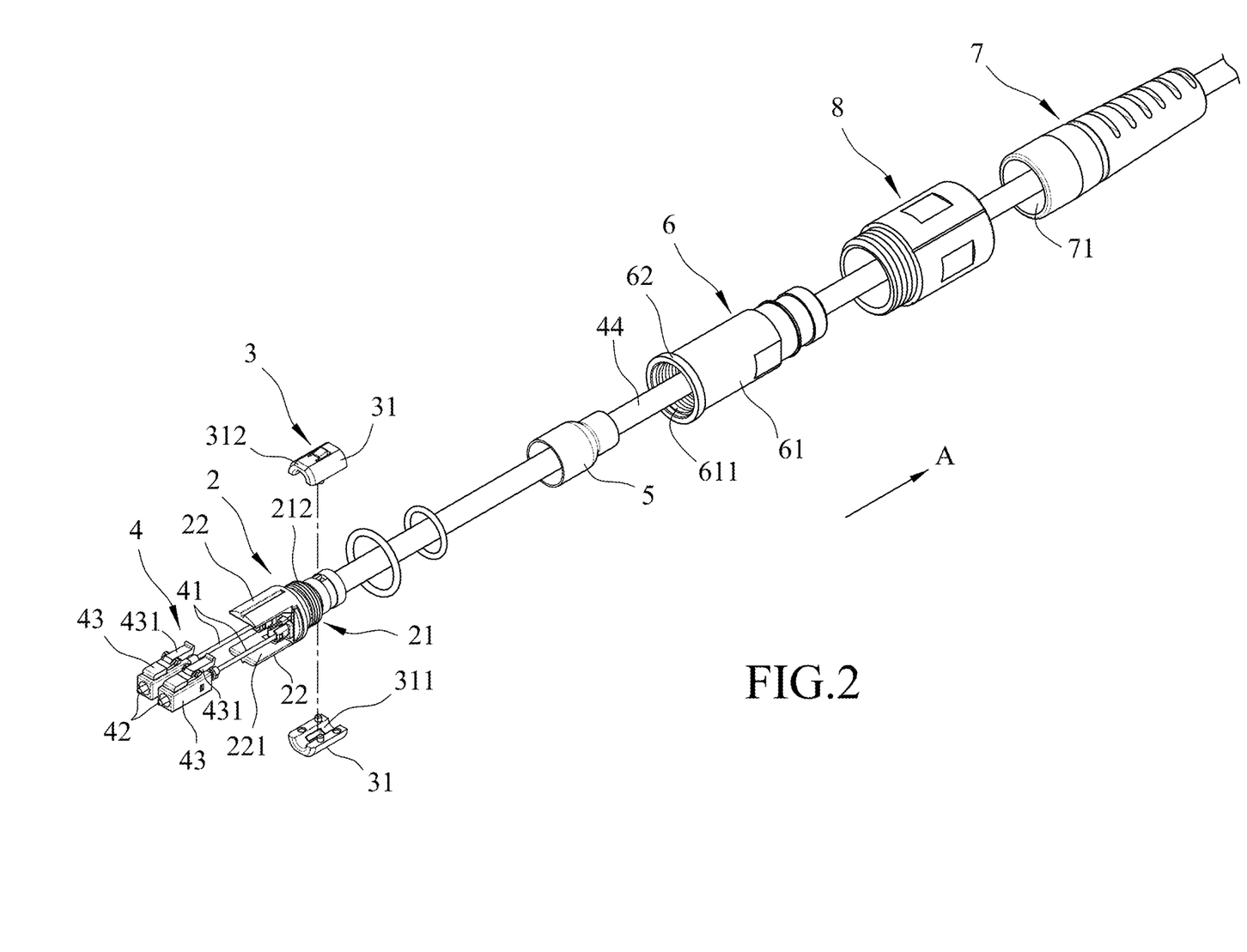
FIG. 2 is a partly exploded perspective view of a first embodiment according to an optical fiber connector of the present disclosure and two optical fibers to be used with the first embodiment.
Figure 3:
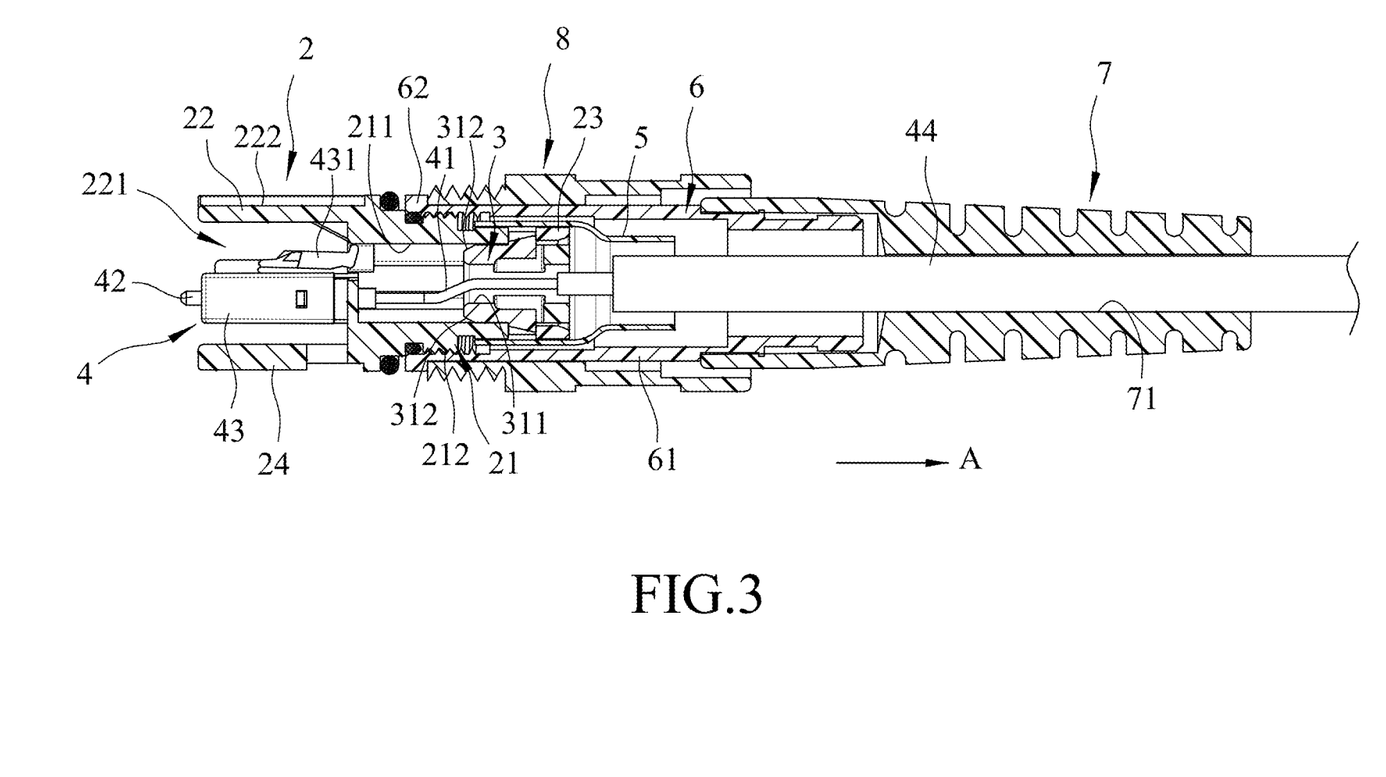
FIG. 3 is a schematic sectional view of the first embodiment.
Figure 4:
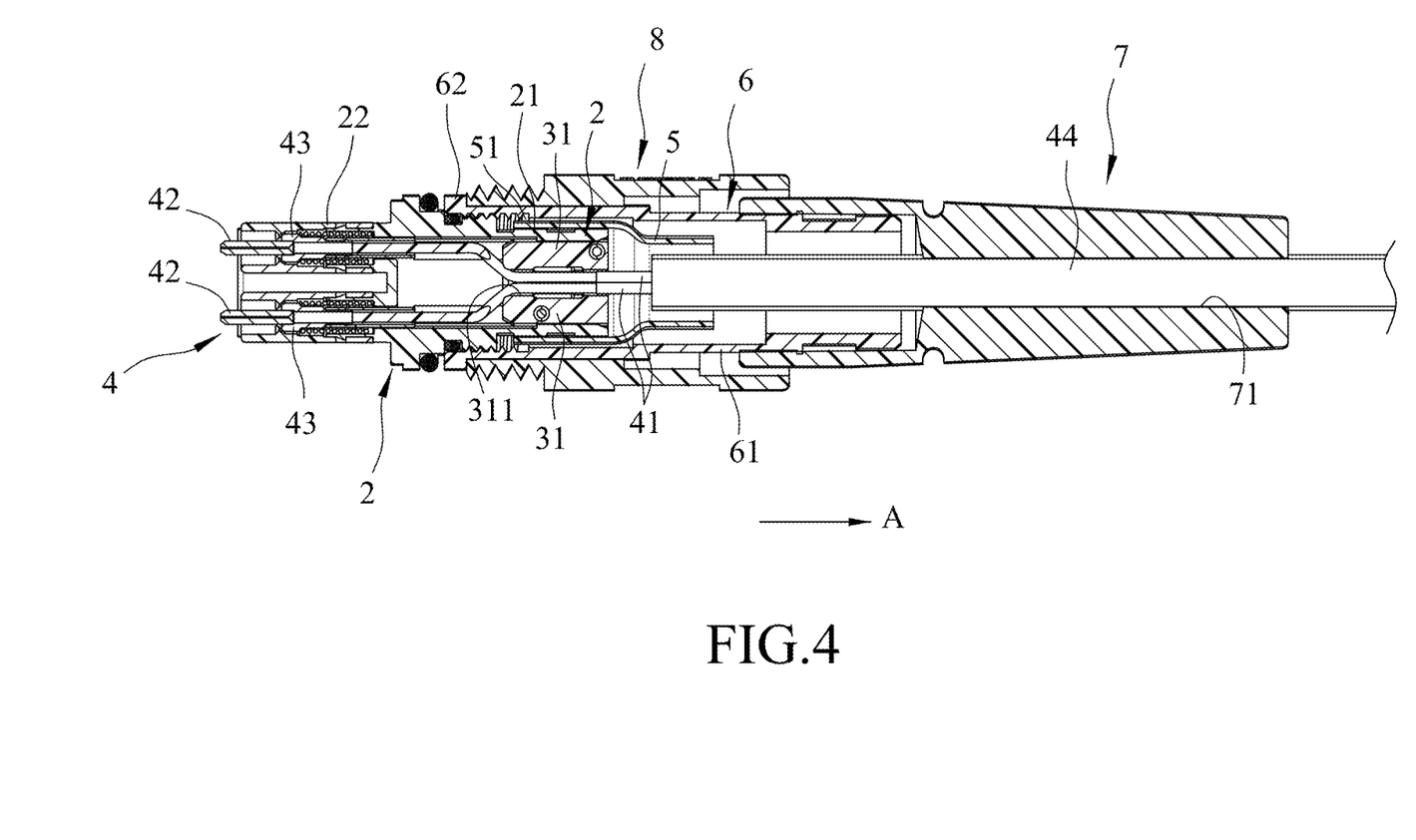
FIG. 4 is a schematic cross-sectional view of the first embodiment.

Referring to FIGS. 2 to 4, a first embodiment of an optical fiber connector according to the present disclosure is shown. The optical fiber connector is adapted to use with at least two optical fibers 41. In this embodiment, two optical fibers 41 are used with the optical fiber connector. The optical fiber connector includes a base seat 2, a positioning member 3, a joint unit 4, a sleeve member 5, a tubular member 6, a tail cover 7 and an outer sleeve 8.

The base seat 2 includes a tubular wall 21 and two extension walls 22. The tubular wall 21 extends in an axial direction (A), defines an axial hole 211 extending in the axial direction (A), and has front and rear ends opposite to each other in the axial direction (A) and an inner surface formed with at least one limiting portion 23. In this embodiment, the limiting portion 23 is configured as an annular flange formed in the inner surface of the tubular wall 21. The extension walls 22 extend from the front end of the tubular wall 21 in the axial direction (A), are spaced apart from each other in a radial direction transverse to the axial direction (A), and define an accommodation space 221 in spatial communication with the axial hole 211.

The positioning member 3 is disposed in the axial hole 211 and abuts against the limiting portion 23 of the base seat 2 to prevent the positioning member 3 from moving outwardly from the rear end of the tubular wall 21. The positioning member 3 includes two positioning halves 31 detachably connected to each other and cooperating with each other to define a channel 311 therebetween. The channel 311 extends in the axial direction (A) and is adapted to permit the optical fibers 41 to extend therethrough. The positioning member 3 has a forwardly converging front end portion 312 for guiding the positioning member 3 to be placed into the axial hole 211 during assembly of the positioning member 3 to the base seat 2. In this embodiment, the positioning halves 31 are in snap-fit engagement with each other and the present disclosure is not limited to the example described herein.

The joint unit 4 includes two central pins 42, two sleeves 43, and a protective sheath 44. The central pins 42 are adapted to be connected respectively to front ends of the optical fibers 41. The sleeves 43 are sleeved respectively on the central pins 42 and are detachably mounted to the base seat 2 such that positions of the central pins 42 relative to each other are fixed. The protective sheath 44 is disposed behind the positioning member 3 and is adapted to surround the optical fibers 41. Specifically, the optical fibers extending through the channel 311 between the positioning halves 31 are wrapped by the protective sheath 44 so as to prevent tangle of the optical fibers 41.

In this embodiment, each of the sleeves 43 is configured as a snap plug and includes a locking tab 431 pressing against the inner surface of the tubular wall 21 so as to be positioned within the base seat 2.

The sleeve member 5 is sleeved and retained on the rear end of the tubular wall 21, is sleeved on the positioning member 3 for preventing removal of the two positioning halves 31 from each other, and is sleeved on a portion of the protective sheath 44.

The tubular member 6 includes a tube portion 61 and a flange portion 62. The flange portion 62 extends radially and outwardly from a front end of the tube portion 61. The tube portion 61 is detachably mounted to the rear end of the tubular wall 21 of the base seat 2 and surrounds the sleeve member 5. In this embodiment, the tube portion 61 is formed with an internal thread 611 and the tubular wall 21 is formed with an external thread 212 threadedly and detachably engaging the internal thread 611. The sleeve member 5 has an outer surface formed with a protrusion 51 (see FIG. 4) abutting against a front end of the internal thread 611 so as to be positioned between the base seat 2 and the tubular member 6.

The tail cover 7 covers a rear end portion of the tubular member 6 and defines a fiber-exiting hole 71 extending in the axial direction (A) and is adapted to permit the optical fibers 41 to extend therethrough. In this embodiment, the protective sheath 44 surrounding the optical fibers 41 extends through the fiber-exiting hole 71 of the tail cover 7.

The outer sleeve 8 is sleeved on a portion of the tail cover 7 and the tubular member 6. Specifically, the outer sleeve 8 is disposed behind and abuts against the flange portion 62 of the tubular member 6 so as to be positioned between the flange portion 62 and the tail cover 7, and to prevent the outer sleeve 8 from being detached forwardly from the tube portion 61 of the tubular member 6.

Figure 6:
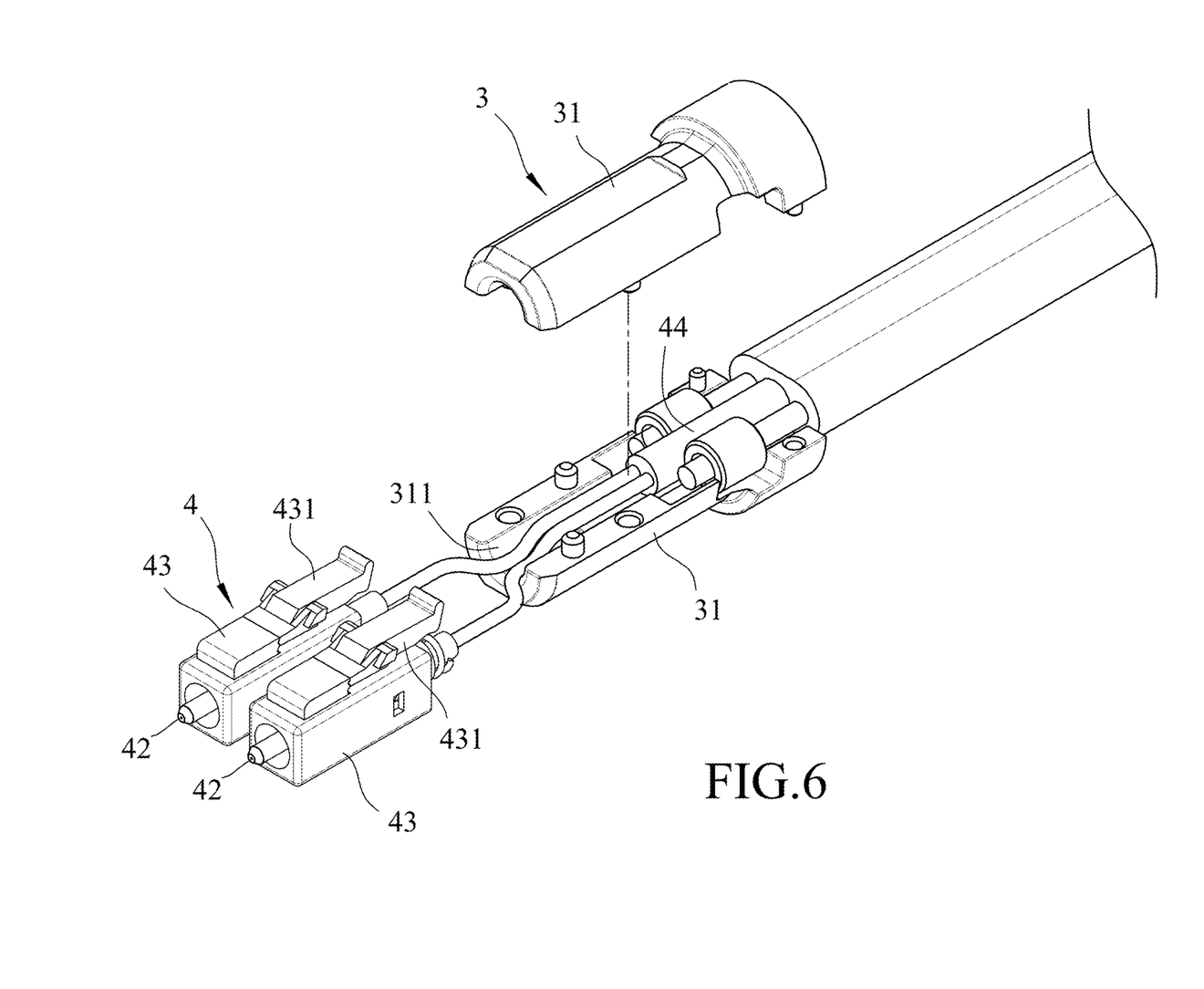
FIG. 6 is a fragmentary partly exploded perspective view of the first embodiment including a modification of a positioning member.

Referring to FIG. 6, a modification of the positioning member 3 is shown. The length of the positioning halves 31 of the modified positioning member 3 in the axial direction (A) is increased and a portion of the protective sheath 44 extends into the channel 311. Note that the configuration of the positioning member 3 is not limited to the examples described herein and can be modified as required.

Figure 7:
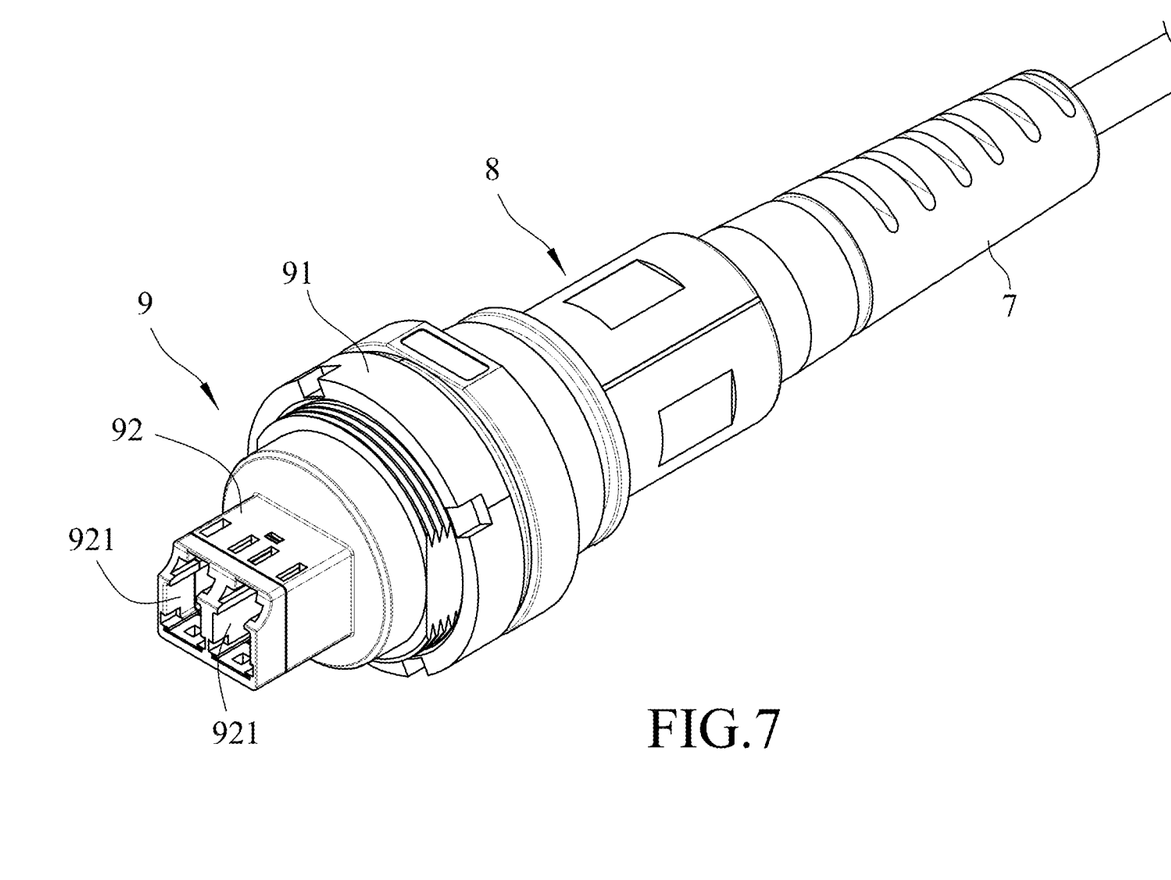
FIG. 7 is a fragmentary perspective view of the first embodiment, illustrating the optical fiber connector further including a receptacle seat.
Figure 8:
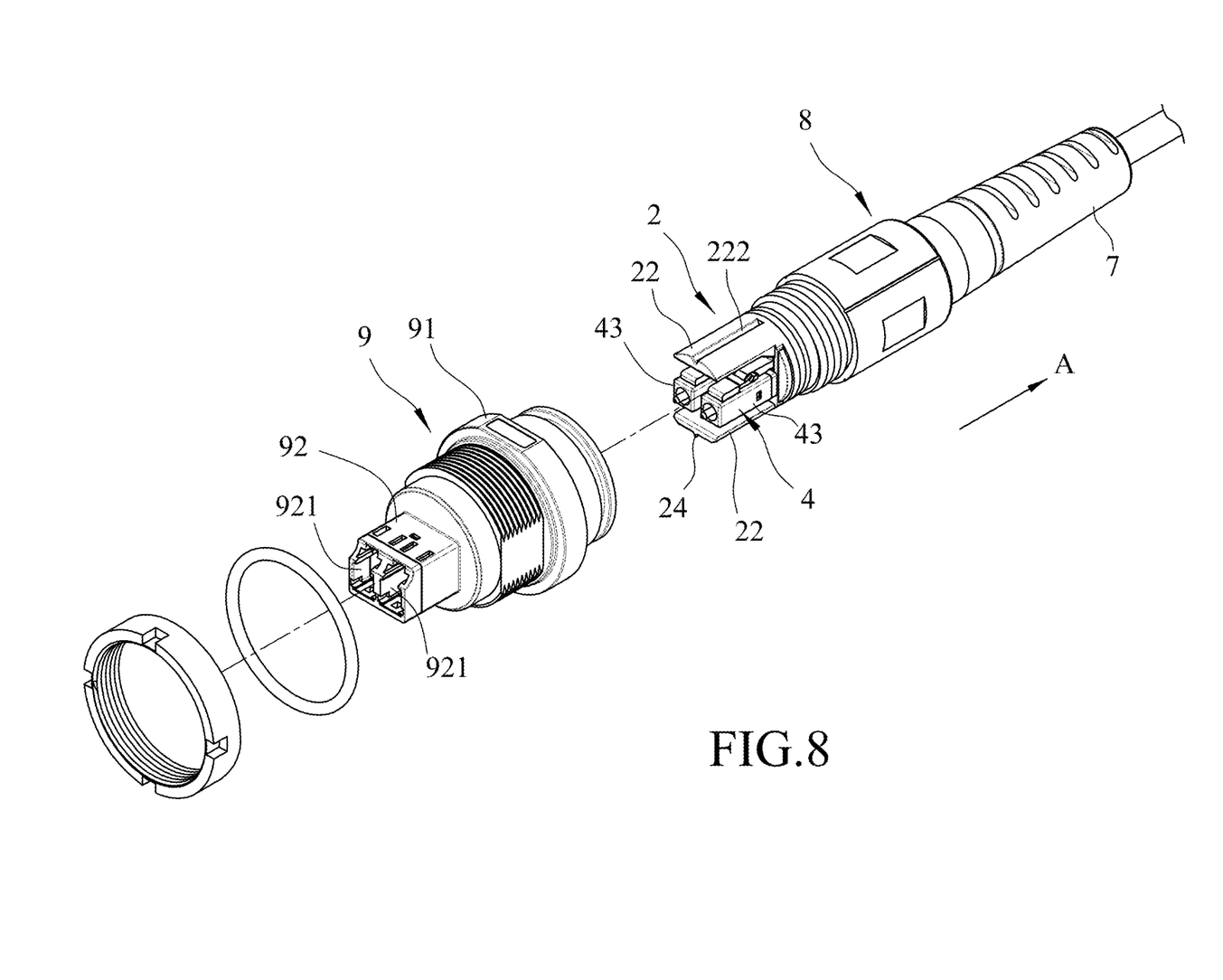
FIG. 8 is a partly exploded perspective view of the first embodiment, illustrating detailed structures of the receptacle seat.
Figure 9:
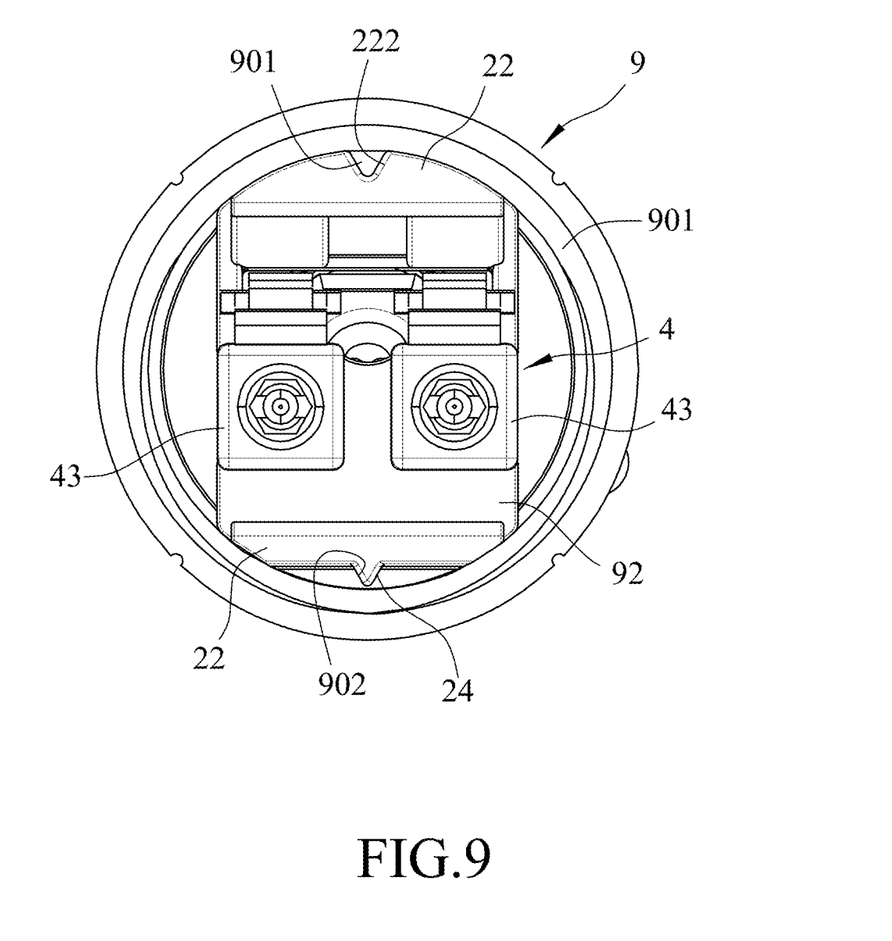
FIG. 9 is a schematic front view of the receptacle seat illustrating connection between the receptacle seat with the base seat and the joint unit.

Further referring to FIGS. 7 to 9, the optical fiber connector further includes a receptacle seat 9. The receptacle seat 9 is detachably mounted to an end of the outer case 8 distal from the tail cover 7, and includes a surrounding wall portion 91 and a partition portion 92. The surrounding wall portion 91 surrounds the extension walls 22 of the base seat 2. The partition portion 92 extends from the surrounding wall portion 91 away from the outer sleeve 8 in the axial direction (A), and defines two receiving spaces 921 within which the sleeves 43 of the joint unit 4 are respectively fixed.

As shown in FIG. 9, the surrounding wall portion 91 has an inner surface formed with a ridge 901 and a groove 902 that are opposite to each other in the radial direction. Referring back to FIG. 5, one of the extension walls 22 of the base seat 2 has an outer surface formed with a guiding groove 222 extending in the axial direction (A), and the other one of the extension walls 22 of the base seat 2 has an outer surface formed with a guiding ridge 24 extending in the axial direction (A). The ridge 901 and the groove 902 of the receptacle seat 9 are engaged respectively with the guiding groove 222 and the guiding ridge 24 of the extension walls 22.

Figure 5:
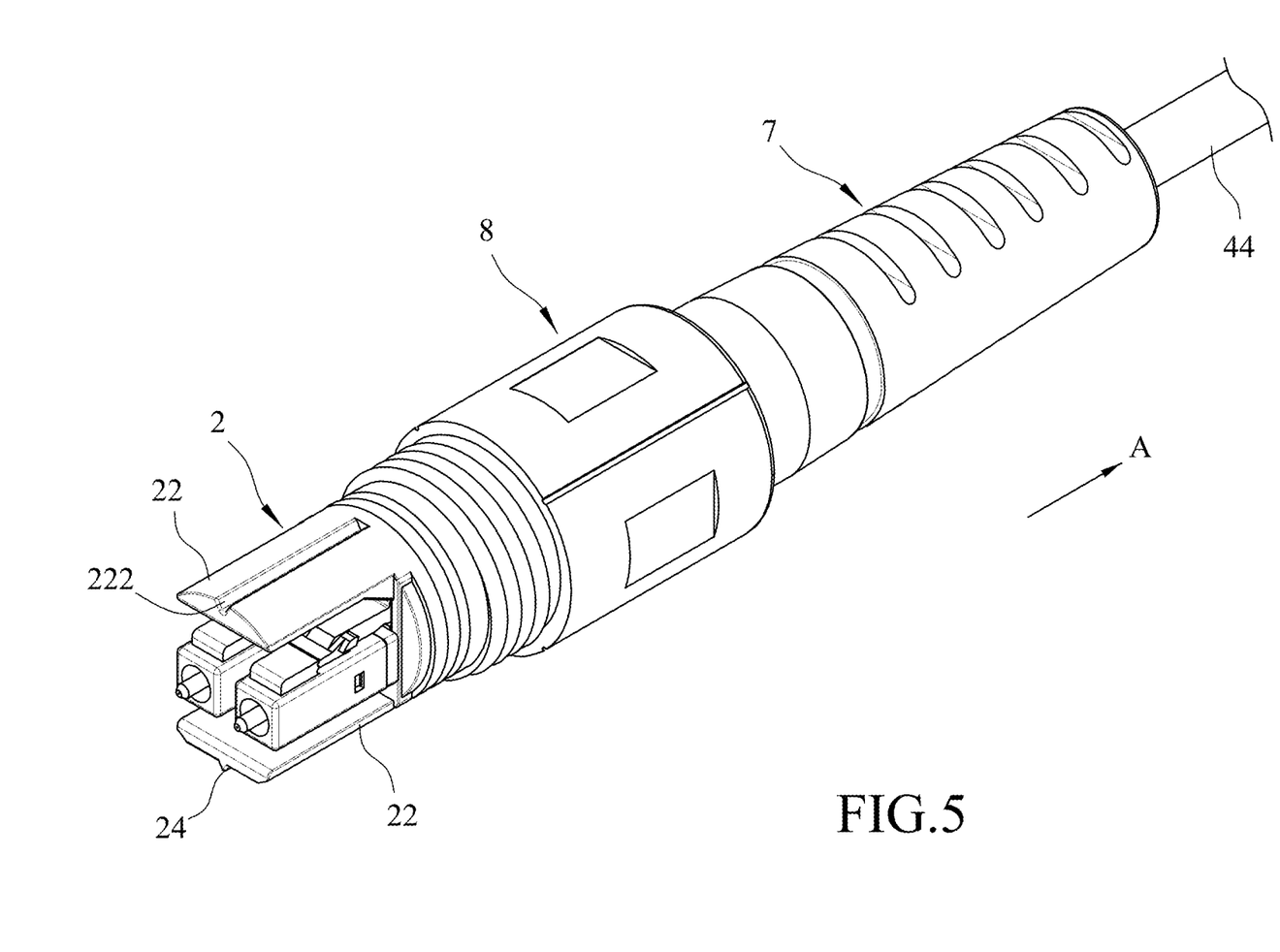
FIG. 5 is a schematic perspective view of the first embodiment.

By virtue of the structures of the guiding groove 222 and the guiding ridge 24 cooperating respectively with the ridge 901 and the groove 902, a foolproof function is provided for guiding the receptacle seat 9 to be mounted to the base seat 2.

During assembly of the optical fiber connector, the positioning halves 31 first clamp the optical fibers 41 therebetween to position the optical fibers 41 in the channel 311. Next, the optical fibers 41 are brought to extend through the axial hole 211 via the rear end of the tubular wall 21 into the accommodation space 211. Then, the positioning member 3 is pushed forward to be inserted into the axial hole 211 and is moved to abut against the limiting portion 23 of the base seat 2, so as to be prevented from moving outwardly from the rear end of the tubular wall 21. Subsequently, the sleeves 43 are sleeved respectively on the central pins 42 such that the locking tabs 431 of the sleeves 43 press against the inner surface of the tubular wall 21. Then, the sleeve member 5 is sleeved on the rear end of the tubular wall 21 and is riveted onto the tubular wall 21. After that, the tubular member 6 is threaded on the tubular wall 21 to position the sleeve member 5 between the tubular wall 21 and the tubular member 6. Subsequently, the outer sleeve 8 is brought to be sleeved on the rear end portion of the tubular member 6 and is moved forwardly to abut against the flange portion 62. Finally, the tail cover 7 is brought to be sleeved on the rear end portion of the tubular member 6 so as to position the outer sleeve 8 between the flange portion 62 and the tail cover 7.

In this embodiment, the sleeves 43 are detachably mounted to the base seat 2 such that the positions of the central pins 42, which are disposed respectively in the sleeves 43, relative to each other are fixed. In this way, it is not necessary for a user to align the central pins 42 respectively with sockets or receptacles to be inserted by the central pins 42. Further, by virtue of the positioning halves 31 defining the channel 311 that permits the optical fibers 41 to extend therethrough and the sleeve member 5 sleeved on the tubular wall 21, the optical fibers 41 are arranged and positioned in a neat way without scattering the same. Additionally, the tubular member 6 and the outer sleeve 8 further provide a rigid structure to protect the optical fibers 41 surrounded by the protective sheath 44.

Figure 10:
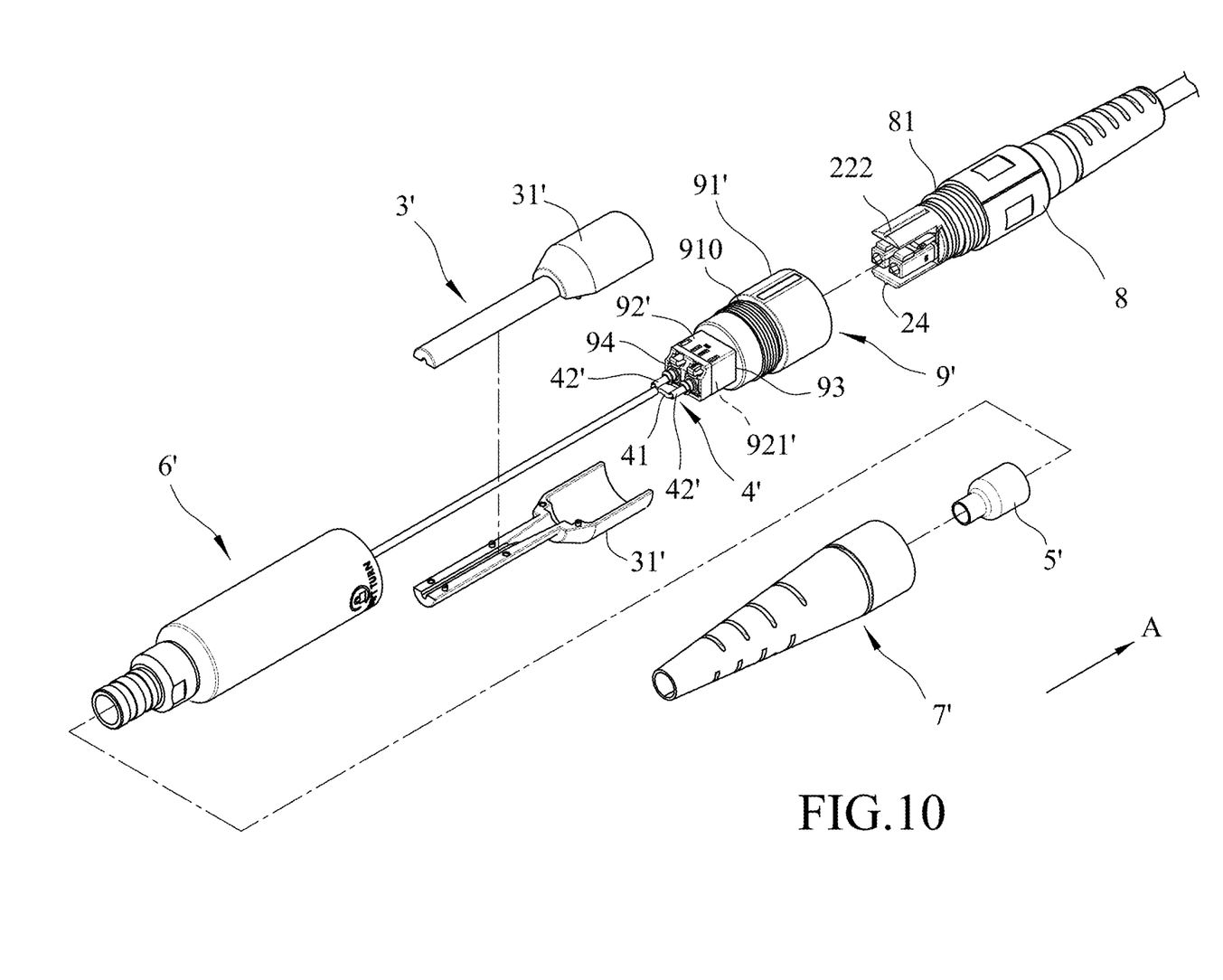
FIG. 10 is an exploded perspective view of a second embodiment according to the optical fiber connector of the present disclosure, which is connected to the first embodiment.
Figure 11:
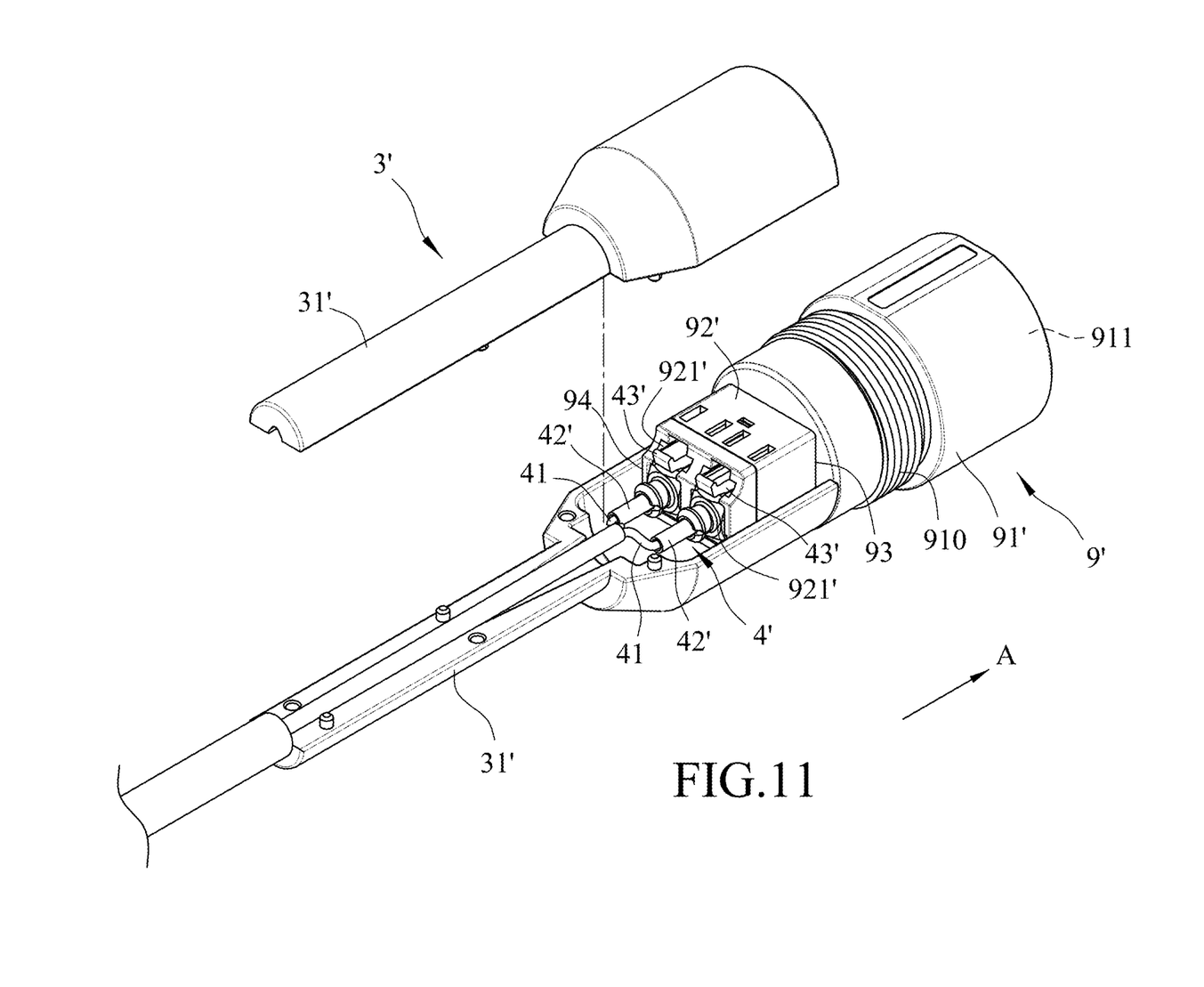
FIG. 11 is a fragmentary partly exploded perspective view of the second embodiment.
Figure 12:
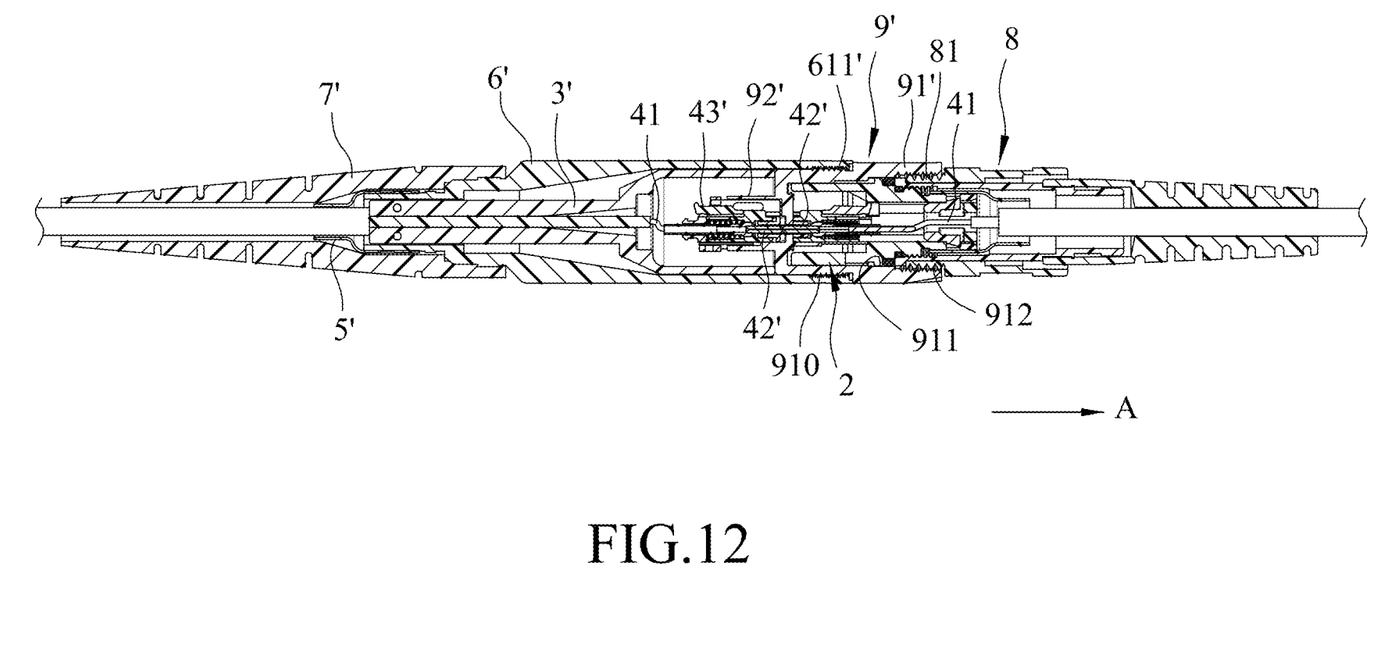
FIG. 12 is a schematic sectional view illustrating connection between the first embodiment and the second embodiment.

Referring to FIGS. 10 to 12, a second embodiment of an optical fiber connector according to the present disclosure is shown. The second embodiment is similar to the first embodiment and the difference therebetween resides in the following. The optical fiber connector of the second embodiment includes a receptacle seat 9', a joint unit 4', a positioning member 3', a tubular member 6', a sleeve member 5', and a tail cover 7'.

The receptacle seat 9' includes a surrounding wall portion 91' and a partition portion 92'. The partition portion 92' extends in the axial direction (A), defines two receiving spaces 921', and has front and rear ends 93, 94 opposite in the axial direction (A). The surrounding wall portion 91' extends from the front end of the partition portion 92' and defines an accommodation space 911.

The joint unit 4' is inserted in the receptacle seat 9' and includes two sleeves 43' and two central pins 42'. As shown in FIG. 11, the sleeves 43' extend respectively and detachably in the receiving spaces 921 of the receptacle seat 9. The central pins 42' are adapted to be connected respectively to the optical fibers 41 and are disposed respectively in the sleeves 43' such that positions of the central pins 42' relative to each other are fixed.

The positioning member 3' is sleeved on a portion of the receptacle seat 9' and surrounds the joint unit 4'. Specifically, the positioning member 3' is disposed behind the surrounding wall portion 91', includes two positioning halves 31', and has a front end proximate to the rear end 94 of the partition portion 92' and a rear end opposite to the front end 93 in the axial direction (A). The positioning halves 31' define a channel 311' extending in the axial direction (A) and adapted to permit the optical fibers 41 to extend therethrough, and are sleeved on and surround the partition portion 92' of the receptacle seat 9'.

The tubular member 6' is connected to the surrounding wall portion 91' of the receptacle seat 9', and is sleeved on and surrounds the positioning member 3'. Specifically, the tubular member 6' has a front end portion formed with an internal thread 611' (see FIG. 12), and the surrounding wall portion 91' has an external thread 910 formed at a position proximate to the front end 93 of the partition portion 92' and threadedly engaging the internal thread 611'. The tubular member 6' has a rear end portion that is distal from the receptacle seat 9', and that is sleeved on and surrounds the positioning member 3'. The sleeve member 5' is sleeved on the rear end portion of the tubular member 6' and surrounds a portion of the positioning member 3'. The tail cover 7' covers and is sleeved on the rear end portion of the tubular member 6'.

The right portion of FIG. 10 illustrates the first embodiment of the optical fiber connector without the receptacle seat 9 shown in FIG. 8 and the left portion of FIG. 10 illustrates the second embodiment of the optical fiber connector to be connected to the first embodiment. As shown in FIG. 12, the surrounding wall portion 91' of the second embodiment has a front portion formed with an internal thread 912 and the outer sleeve 8 of the first embodiment has a front portion formed with an external thread 81 threadedly engaging the internal thread 912 such that the central pins 42' of the second embodiment are connected respectively to the central pins 42 of the first embodiment. In this way, the optical fibers 41 connected to the central pins 42 of the first embodiment are coupled respectively to the optical fibers 41 connected to the central pins 42' of the second embodiment.

To sum up, by virtue of the sleeves 43, 43' that are sleeved respectively on the central pins 42, 42' and that are detachably mounted to the base seat 2 or the receptacle seat 9', positions of the central pins 42, 42' relative to each other are fixed on the base seat 2 or the receptacle seat 9'. Further, the design of the guiding grooves 222 and the guiding ridge 24 of the extension walls 22 of the base seat 2 of the first embodiment cooperating with the surrounding wall portion 91' of the second embodiment that has a structure similar to the surrounding wall portion 91 of the first embodiment provides a simple and foolproof way to connect plural optical fiber connectors of the present disclosure. Finally, the channel 311 defined in the positioning member 3, the sleeve member 5 and the protective sheath 44 cooperate with one another to arrange and position the optical fibers 41 in a neat way without scattering the same.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An optical fiber connector adapted to use with at least two optical fibers and comprising:
    a base seat including a tubular wall that extends in an axial direction, that defines an axial hole extending in the axial direction, and that has front and rear ends opposite to each other in the axial direction, and two extension walls that extend from said front end of said tubular wall in the axial direction, that are spaced apart from each other in a radial direction transverse to the axial direction, and that define an accommodation space in spatial communication with said axial hole;
    a positioning member disposed in said axial hole and defining a channel that extends in the axial direction and that is adapted to permit the optical fibers to extend therethrough; and
    a joint unit including two central pins adapted to be connected respectively to the optical fibers, and two sleeves sleeved respectively on said central pins and detachably mounted to said base seat such that positions of said central pins relative to each other are fixed.

2. The optical fiber connector as claimed in claim 1, wherein said tubular wall has an inner surface formed with at least one limiting portion that abuts against said positioning member to prevent said positioning member from moving outwardly from said rear end of said tubular wall.

3. The optical fiber connector as claimed in claim 1, wherein said positioning member includes two positioning halves detachably connected to each other and cooperating with each other to define said channel therebetween, said optical fiber connector further comprises a sleeve member sleeved and retained on said rear end of said tubular wall and sleeved on said positioning member for preventing removal of said two positioning halves from each other.

4. The optical fiber connector as claimed in claim 3, wherein said positioning member has a forwardly converging front end portion for guiding said positioning member to be placed into said axial hole during assembly of said positioning member to said base seat.

5. The optical fiber connector as claimed in claim 3, further comprising a tubular member detachably mounted to said rear end of said tubular wall of said base seat and surrounding said sleeve member so as to retain said sleeve member between said base seat and said tubular member.

6. The optical fiber connector as claimed in claim 5, further comprising a tail cover covering a rear end portion of said tubular member and defining a fiber-exiting hole extending in the axial direction and adapted to permit the optical fibers to extend therethrough.

7. The optical fiber connector as claimed in claim 6, wherein said joint unit further includes a protective sheath adapted to surround the optical fibers, and extending through said fiber-exiting hole of said tail cover.

8. The optical fiber connector as claimed in claim 7, further comprising an outer sleeve sleeved on a portion of said tail cover and said tubular member, said tubular member including a tube portion and a flange portion extending radially and outwardly from a front end of said tube portion and disposed in front of and abutting against said outer sleeve, so as to prevent said outer sleeve from being detached forwardly from said tube portion.

9. The optical fiber connector as claimed in claim 8, further comprising a receptacle seat detachably mounted to an end of said outer case distal from said tail cover, and including a surrounding wall portion that surrounds said extension walls of said base seat, and a partition portion that extends from said surrounding wall portion away from said outer sleeve in the axial direction, and that defines two receiving spaces within which said sleeves of said joint unit are respectively fixed.

10. The optical fiber connector as claimed in claim 9, wherein:
   one of said extension walls of said base seat has an outer surface formed with a guiding groove extending in the axial direction;
   the other one of said extension walls of said base seat has an outer surface formed with a guiding ridge extending in the axial direction; and
   said surrounding wall portion has an inner surface formed with a ridge and a groove that are opposite to each other in the radial direction and that are engaged respectively with said guiding groove and said guiding ridge of said extension walls.

11. An optical fiber connector adapted to use with at least two optical fibers, comprising
   a receptacle seat including a partition portion extending in an axial direction, defining two receiving spaces, and front and rear ends opposite in the axial direction, and a surrounding wall portion extending from said front end of said partition portion and defining an accommodation space;
   a joint unit including two sleeves extending respectively and detachably in said receiving spaces, and two central pins adapted to be connected respectively to the optical fibers and disposed respectively in said sleeves such that positions of said central pins relative to each other are fixed;
   a positioning member disposed behind said surrounding wall portion, defining a channel that extends in the axial direction and that is adapted to permit the optical fibers to extend therethrough, and having a front end proximate to said rear end of said socket portion and a rear end opposite to said front end of said positioning member in the axial direction;
   a tubular member connected to said surrounding wall portion, and sleeved on and surrounding said positioning member; and
   a tail cover covering an end portion of said tubular member distal from said receptacle seat.

* * * * *